INVENTORS
JERRY M. GLASSON
WALTER B. McCLELLAND
BY R. C. Lerry
ATTORNEY

INVENTORS
JERRY M. GLASSON
WALTER B. McCLELLAND
BY R. C. Lerry
ATTORNEY

United States Patent Office 3,308,434
Patented Mar. 7, 1967

3,308,434

SYNCHRONIZATION CIRCUIT FOR SIGNAL GENERATORS USING COMPARISON OF A SPECIFIC DATA MESSAGE

Jerry M. Glasson, Chicago, and Walter B. McClelland, Park Ridge, Ill., assignors to Teletype Corporation, Skokie, Ill., a corporation of Delaware Filed Jan. 9, 1963, Ser. No. 250,374
7 Claims. (Cl. 340—167)

This invention relates to electronic signal generators and more particularly to a message synchronization circuit for a telegraph signal generator of the type which generates a fixed message for comparison with the same message obtained from an external source.

In the maintenance of telegraph equipment there is a need for signal generators to generate a fixed massage pattern which may be used in testing the operation of the equipment to determine its error rate. When a signal generator is used to generate a message for comparison with the same message supplied from another source over telegraph transmission facilities in order to determine the error rate of the telegraph equipment utilized in the transmission path, it becomes necessary to synchronize the signal generator at the bit rate of the received message and also to synchronize the entire message pattern with the received message pattern before any accurate checking of the equipment can be made.

It is an object of this invention to provide a message synchronization circuit for a fixed message signal generator.

It is a more specific object of this invention to synchronize the phase of a fixed message produced by a fixed message signal generator with the phase of the same fixed message received from another source.

It is an additional object of this invention to synchronize the phase of the output signal of a multi-character fixed signal generator with the same multi-character signal supplied from an external source by causing the signal generator to advance extra steps whenever a predetermined difference between the two signals occurs.

It is yet another object of this invention to provide a message synchronization means for synchronizing a multi-character message generated by a signal generator with the same multi-character message received from another source, when the two messages are already in bit synchronization with one another, by causing the signal generator to advance an extra bit each time a predetermined difference between the two signals occurs.

These and other objects are accomplished by a preferred embodiment of this invention in which the output signal of a fixed message signal generator is maintained in bit synchronization with the same fixed message received from another source by timing pulses derived from each bit of the message received from the other source. The output signal of the signal generator is sampled and regenerated in response to these timing pulses; and each time a sampled bit and the simultaneously occurring bit in the received message have a predetermined relationship indicating that the two messages are not in phase synchronization, a monostable multivibrator is triggered and causes an extra timing or driving pulse to be supplied to the signal generator to advance it an extra bit to bring the generated message into synchronization with the received message. These extra driving pulses do not have any effect upon the times at which the output signal of the signal generator is sampled and regenerated.

Further objects, features and advantages of this invention will become apparent to those skilled in the art upon consideration of the following specification taken in conjunction with the drawings in which.

In the description of this invention the terms "high" and "low" are used to designate relative potentials at the inputs and outputs of some of the circuit elements. The term "high" is used to designate a potential that is positive relative to the potential indicated when the term "low" is used.

Figure 1:
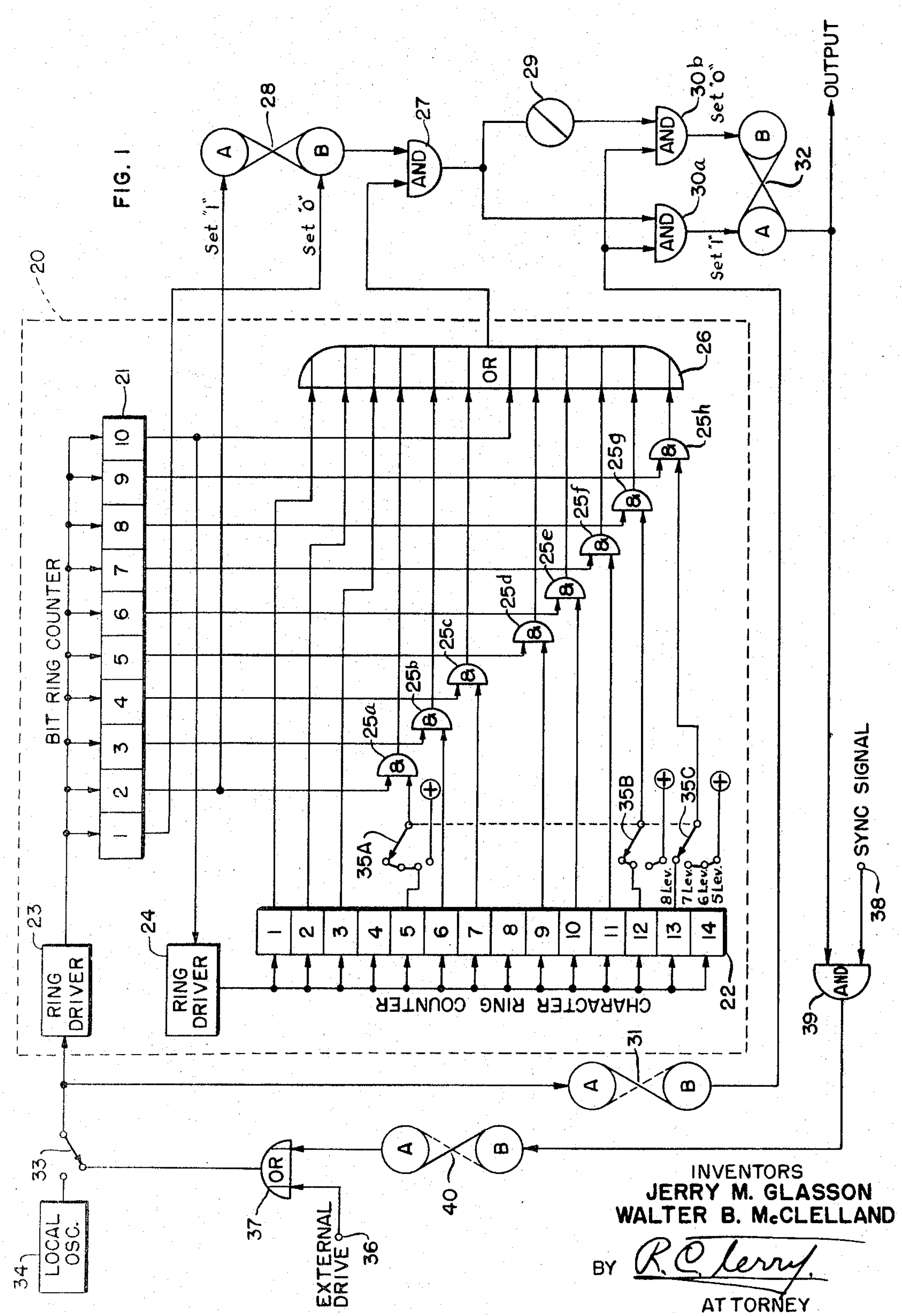
FIG. 1 is a block diagram of the circuit of this invention.

Referring now to FIG. 1 of the drawings, there is shown enclosed by dotted lines a signal generator 20 which includes a ten-element bit ring counter 21 and a fourteen-element character ring counter 22. The number of elements in each of these ring counters is chosen in accordance with a preferred embodiment of this invention, but it will be apparent that the particular number chosen is in no way to be considered as limiting and may be increased ar decreased as the specific application in which the invention may be used varies.

The signal generator 20 generates a fixed message in the well-known start-stop telegraph code format. The first stage of the bit ring counter 21 provides the "start" pulse; the next eight stages provide the information pulses or bits in cooperation with the character ring counter 22; and the tenth stage provides the "stop" pulse in a manner hereinafter described. Each complete cycle of operation of the bit ring counter 21 defines a telegraph character, and the particular character generated is determined by the particular stage of the character ring counter 22 which is energized during each cycle of the counter 21.

Timing pulses at the particular bit rate at which it is desired to operate the signal generator are applied to a first ring driver 23 which causes advance pulses to be applied to the bit ring counter 21, advancing the counter one step or stage for each pulse. The ring counters 21 and 22 are preferably of a truncated-N type common in the art and no further detailed explanation of their operation is considered necessary. Counters of the type shown in the Patent No. 2,886,797 granted May 12, 1959, to J. Gardberg also may be used. Each time that the bit ring counter 21 advances through all ten stages or steps, a drive pulse is supplied from its tenth stage to the ring driver 24 which then applies a drive pulse to the character ring counter 22 to advance that counter one stage. Thus, the counter 21 completes an entire cycle during the time that each stage of the character ring counter 22 is energized. The outputs of some of the stages in the ring counters 21 and 22 are applied to an "AND" gate matrix comprised of a plurality of "AND" gates 25A to 25H. The outputs of these "AND" gates are connected to the input of an "OR" gate 26, and the outputs of the first three stages of the character ring counter and the tenth stage of the bit ring counter also are connected to the input of the "OR" gate 26. The output of the first stage of the bit ring counter 21, and the fourth, eighth and fourteenth stages of the character ring counter 22 are not supplied to the "OR" gate 26 for reasons which will become apparent in the detailed description of the operation of the circuit given hereinafter.

The "OR" gate 26 has a "high" output signal whenever the output from one of the stages of the bit ring counter 21 and the output from one of the stages of the character ring counter 22 coincide at the input to one of the "AND" gates 25A to 25H, or when the output of any one of the first three stages of the character ring counter 22 or the output of the tenth stage of the bit ring counter 21 is present. This "high" output signal from the "OR" gate 26 represents a binary "1" or "mark" in the message generated by the signal generator 20, and a "low" output signal from the "OR" gate 26 represents a binary "0" or "space" in the generated message. These outputs signals are applied to an "AND" gate 27 which will pass a "high" output signal only if a binary "1" is supplied to it from the "OR" gate 26 at the same time that a priming signal is supplied to it from the output of the active element B of a bistable multivibrator or flip-flop 28. A "low" output signal is passed by the "AND" gate 27 when a binary "0" or a "space" is present at the output of the "OR" gate 26 regardless of whether or not a priming signal is applied to the "AND" gate 27 from the flip-flop 28.

The output of the "AND" gate 27 is supplied directly to an "AND" gate 30*a* and through an inverter 29 to an "AND" gate 30*b*. When a signal representing a binary "1" is passed by the "AND" gate 27, the output of the "AND" gate 27 is "high" and acts as a priming potential for the "AND" gate 30*a*. Since this same output signal of the "AND" gate 27 is inverted by the inverter 29, a "low" potential is supplied to the "AND" gate 30*b*; and the "AND" gate 30*b* is not primed by it. Whenever there is a "low" output signal from the "OR" gate 26 representing a binary "0" in the generated signal, the "AND" gate 30*a* is not primed since the output of the "AND" gate 27 is "low"; but the inverter 29 causes the signal applied to the "AND" gate 30*b* to be "high" thereby priming the "AND" gate 30*b*.

The signals generated by the signal generator 20 then are sampled in the "AND" gates 30*a* and 30*b* by the application of a sample pulse from a monostable or one-shot multivibrator 31. The manner in which the monostable multivibrator 31 is triggered to produce the sample pulses will be described subsequently. At the time a sample pulse is applied to the "AND" gates 30*a* and 30*b*, only the particular one of the gates which is primed at that time passes an output trigger pulse.

The trigger pulses from the "AND" gate 30*a* are applied to the active element A of a bistable multivibrator or flip-flop 32 and the trigger pulses from the "AND" gate 30*b* are applied to the active element B of the bistable multivibrator 32. Trigger pulses applied to the active element A of the multivibrator 32 cause that active element to be rendered nonconductive signifying that the multivibrator 32 is set to its "1" or "mark" state and pulses applied to the active element B of the multivibrator 32 cause that element to be rendered nonconductive thereby signifying that the multivibrator is set to its "0" or "space" state. The output signals from the signal generator are obtained from the output of the active element A of the bistable multivibrator 32.

When it is desired to use the signal generator 20 as a local signal generator without the necessity of synchronizing the message generated by it with a similar message obtained from an external source, a switch 33 is moved to its upper contact thereby connecting the output of a local oscillator 34 to the input of the ring driver 23 and to the input of the monostable multivibrator 31. The local oscillator 34 then generates timing pulses at the bit rate at which operation of the signal generator is desired. The message generated by the signal generator 20 will be repeated continuously as long as pulses from the local oscillator 34 are supplied to the ring bit driver 23 and the multivibrator 31.

When the first stage of the bit ring counter 21 is energized, a pulse is applied to the active element B of the bistable multivibrator 28 to render that element nonconductive thereby setting the flip-flop 28 to "0." When this occurs the output of the active element B of the flip-flop 28 is "low" thereby removing the priming potential from the "AND" gate 27, so that the output of the gate 27 appears as a "space" or "0" regardless of what the output of the "OR" gate 26 at that time. This "space" signal which is obtained from the "AND" gate 27 each time that the first stage of the ring counter 21 is energized represents the well-known "start" pulse used in the start-stop system of telegraphy. When the bit ring counter 21 receives the next drive pulse from the ring counter 23, stage two is energized causing a set "1" pulse to be applied to the active element A of the flip-flop 28 thereby rendering that element nonconductive and rendering active element B of the flip-flop 28 conductive. The output of the active element B then rises thereby restoring the priming potential applied to the "AND" gate 27, which in turn causes the output of the "AND" gate 27 to be under the control of the output of the "OR" gate 26. The flip-flop 28 remains in this set "1" state until the bit ring counter 21 has gone through a complete cycle and the first stage is once again reenergized, whereupon the above sequence is repeated. It should be noted at this time that the bistable multivibrator 28 in conjunction with the bit ring counter 21 may be used to insert "space" signals in addition to the "start" pulse mentioned above if desired. For example, to obtain the number 3 element spacing in addition to the number 1 element ("start" pulse), the output of stage three of the counter 21 may be applied to the active element B of the bistable multivibrator 28 and the output of stage four may be applied to the active element A of the multivibrator 28. When these latter two stages of the counter 21 are energized in turn, a "space" signal is obtained from the output of the "AND" gate 27 followed by a reapplication of the priming potential to the gate 27.

Assume that at the time the bit ring counter 21 is first driven sequentially through its ten stages, stage one of the character ring counter 22 is energized thus having a "high" output. It is to be noted that this stage is connected directly to an input of the "OR" gate 26 thereby causing the output of the "OR" gate 26 to represent binary "1" or "mark" throughout the entire cycle of the bit ring counter 21. As a result, the only time that the "AND" gate 27 passes a "space" signal is during the "start" pulse generation described hereinabove; and once the "AND" gate 27 is primed by the flip-flop 28, the output of the "AND" gate 27 represents "mark" for each of the remaining bits of the first character. Consequently, the "AND" gate 30*b* is primed during the start interval of this character and the "AND" gate 30*a* is primed for the remainder of the character.

When the tenth stage of the ring counter 21 is energizer, its output is applied directly to the "OR" gate 26 causing a binary "1" or "mark" representative of the "stop" pulse in the start-stop telegraph code to be applied through the "OR" gate 26 to the input of the "AND" gate 27. At the same time, the output pulse from the tenth stage of the ring counter 21 is applied to the ring driver 24 which in turn causes the character ring counter 22 to be stepped to the next stage. It will be noted that stage two of the character ring counter 22 is connected directly to the "OR" gate 26 as was stage one, and the same sequence of operation described for stage one occurs in conjunction with stage two. Additional drive or timing pulses applied to the ring counter 21 cause that counter to continually cycle in the manner described above; and each time that a complete cycle of the counter 21 occurs, the character ring counter 22 is advanced to the next stage.

Examination of the circuit connections shown in FIG. 1 reveals that the first three stages of the character ring counter 22 causes a constant "mark" signal to be applied to the "OR" gate 26. The fourth, eighth and fourteenth stages of the counter 22 have no output connections, thereby causing the output of the "OR" gate 26 to be constantly "spacing" throughout the entire cycle of operation of the bit ring counter 21 for those characters; and the fifth, sixth, seventh, ninth, tenth, eleventh, twelfth, and thirteenth stages of the character ring counter 22 are connected to one input of "AND" gates 25A through 25H, respectively, with the second through ninth stages of the bit ring counter 21 being connected to the other input of the "AND" gates 25A to 25H, respectively.

Figure 3:
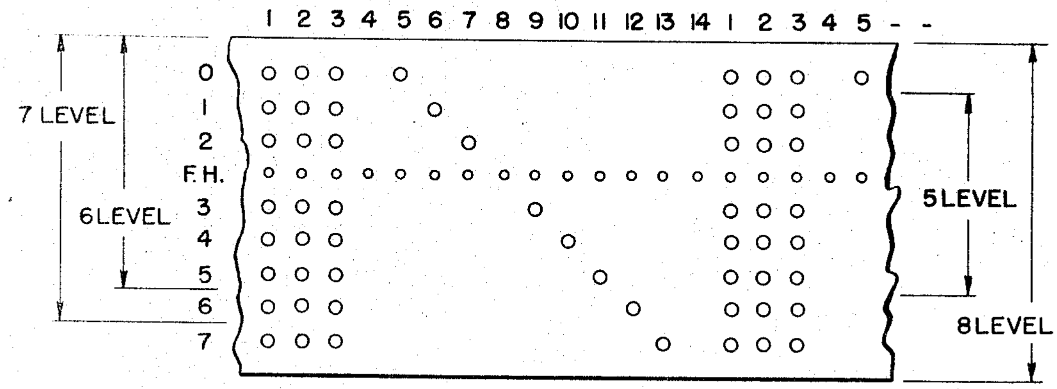
FIG. 3 represents a section of a telegraph perforated tape perforated with the message generated by the signal generator of FIG. 1.

With a mode selection switch 35A, 35B and 35C connected in the position shown in FIG. 1, the message generated by the signal generator circuit 20 gives a test message pattern such as that shown in FIG. 3. The particular stage of the character ring counter 22 which results in each of the patterns is designated by the numbers 1 through 14 shown above each character in FIG. 3 as these characters appear in a conventional 8-level telegraph tape. By changing the mode switch 35 to the 5, 6 or 7-level position shown in FIG. 1, various ones of the "AND" gates 25A, 25G and 25H may have the character input permanently connected to a source of positive or "high" potential thereby causing these gates to pass a "mark" or binary "1" each time that the corresponding stage of the bit ring counter 21 is also energized or "high," thereby removing control of these gates from the character ring counter 22. This feature is provided so that the signal generator may be used in conjunction with telegraph equipment using less than the 8-level transmission shown by the preferred embodiment in the drawing.

Each time that a timing pulse is supplied to the bit ring counter driver 23, a pulse is also supplied to the monostable multivibrator 31 to trigger that multivibrator into its quasi-stable state. In the preferred embodiment of this invention the duration of the quasi-stable state of the monostable multivibrator 31 is chosen to be approximately 400 microseconds which is half the duration of each bit of the signal which is generated. A sample pulse is obtained from the output of the monostable multivibrator 31 at the end of this interval so that the output signal of the signal generator 20 is sampled at approximately its midpoint thereby preventing any errors from occuring due to sampling during possible transitions in the signal. As stated previously, the bistable multivibrator 32 is set either to "1" or "0" by the sample pulse and it remains set to this particular state until the occurrence of the next sample pulse from the monostable multivibrator 31. In this manner the signal output from the signal generator 20 is regenerated by the bistable multivibrator 32.

When it is desirable to utilize the signal generator 20 for producing a fixed message signal to be compared in error detection apparatus with the same fixed message signal received from another source, the switch 33 is moved to its lower position. The timing pulses for the bit ring counter driver 23 and the monostable multivibrator 31 then are derived from the received signal by suitable means (not shown). One such means which may be used is the 902A Data Test Set manufactured by the Western Electric Company and shown and described in the "1307 Instruction Bulletin for Data Test Set 902A" (copyrighted 1961 by American Telephone and Telegraph Company). This test set is a distortion measuring and error checking set for comparing a received fixed pattern binary signal train with the same pattern supplied locally as a reference signal and recording the total number of times the binary bits in the two signals differ.

The signal upon which an error check is to be made is supplied to the 902A Data Test Set or other suitable apparatus which derives a train of timing pulses from the received signal, one timing pulse occurring for each bit of the signal. At the same time, synchronization pulses are derived from the received signal with a synchronization pulse occurring each time that a binary "1" or a "mark" occurs in the input signal train.

Figure 2:
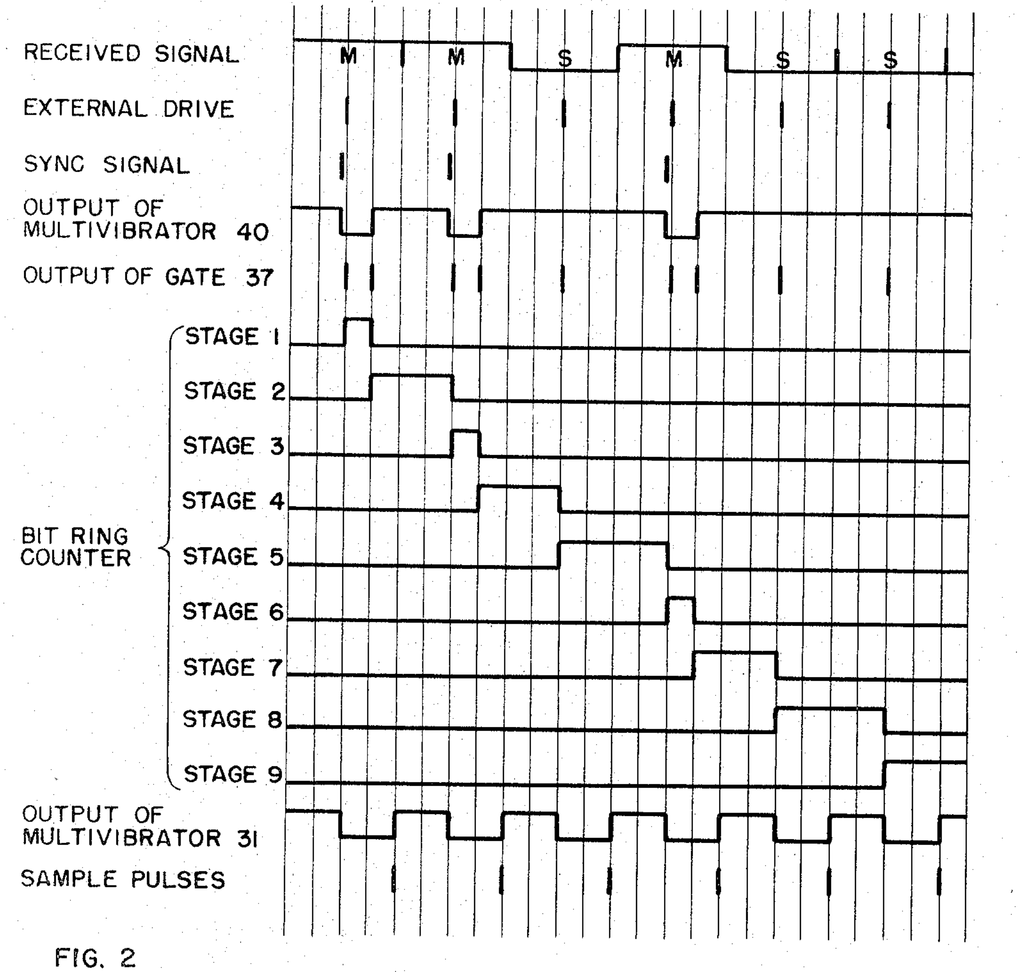
FIG. 2 shows waveforms useful in describing the operation of the circuit of FIG. 1.

In order to understand the operation of the synchronizing circuit of this invention more fully, the description of operation will be made with reference to the waveforms shown in FIG. 2. A sample of a portion of the received signal is shown in FIG. 2 and this signal comprises a train of binary data bits, the first two of which are "mark" or "1" followed by a "space" or "0" which in turn is followed by another "marking" data bit followed by two "space" data bits. This signal is representative of a portion of a test message identical to that shown in FIG. 3. At approximately the midpoint of each of the received signal data bits, an external drive timing pulse is generated by the 902A Data Test Set, and these timing pulses are supplied from the 902A Data Test Set to an input terminal 36 (FIG. 1). From the terminal 36 these timing pulses are passed by an "OR" gate 37 and are applied through the lower contact of the switch 33 to the ring driver 23 and the monostable multivibrator 31 to cause the signal generator 20 and the multivibrator 31 to function in the same manner as hereinbefore set forth in the discussion of operation of the signal generator when the local oscillator 34 is used.

It is to be noted that operation of the signal generator is in bit synchronization with the received signal since one external drive timing pulse is applied to the terminal 36 at the midpoint of each incoming bit in the received signal. As stated previously, synchronization pulses are derived from the received signal each time that a mark occurs and these pulses are applied as a synchronizing signal to a terminal 38 as one input to an "AND" gate 39. The other input for the "AND" gate 39 is obtained from the output of the signal regenerator flip-flop 32. When the output of the flip-flop 32 is "high," signifying a "space" or binary "0" in the output signal of the signal generator 20, a priming potential is applied from the flip-flop 32 to the gate 39. If a synchronization pulse is applied to the terminal 38 when the gate 39 is primed by the "space" output of the flip-flop 32, a pulse is passed by the "AND" gate 39 to trigger a monostable multivibrator 40 into its quasi-stable state. If at the time a synchronization signal pulse is applied to the terminal 38 a "mark" is present from the output of the flip-flop 32, the output of the flip-flop 32 is "low" and no priming potential is applied to the "AND" gate 39. Thus, the synchronization pulse is not passed by the "AND" gate 39 when a "mark" is present at the output of the flip-flop 32.

The duration of the quasi-stable state of the monostable multivibrator 40 is chosen to be approximately half as long as the duration of the quasi-stable state of the monostable multivibrator 31. Thus, in the preferred embodiment of this invention the duration of the quasi-stable state of the monostable multivibrator 40 is approximately 200 microseconds.

Assume that the output of the signal generator 20, at the time that the received signal shown on FIG. 2 occurs, is blank or all spacing. When this occurs, each of the synchronization signal pulses shown in FIG. 2 is passed by the "AND" gate 39 since a priming potential is always present on the "AND" gate 39 from the flip-flop 32 which remains set to "space." These synchronization signal pulses cause the output of the monostable multivibrator 40 to be as shown in FIG. 2. It should be noted that at the same time the synchronous signal pulses are applied to the terminal 38, the external drive timing pulses continue to be applied to the terminal 36. The monostable multivibrator 40 effectively delays the synchronization pulses passed by the "AND" gate 39 and supplies them to the "OR" gate 37 each time the monostable multivibrator 40 reverts back to its original stable state. These delayed synchronization pulses are passed by the "OR" gate 37 in addition to the external drive pulses supplied to the terminal 36. As a result, the output of the "OR" gate 37 appears as shown in FIG. 2.

As stated previously, each time a pulse is applied to the bit ring counter driver 23, that driver causes the bit ring counter 21 to advance one step or stage.

Referring now to FIG. 2, assume that the first external drive timing pulse applied to the system causes the first stage of the bit ring counter to be energized at the time that the midpoint of the first bit of the received signal occurs. Since this first data bit of the received signal shown in the example is a "mark" and since it is assumed that the output of the flip-flop 32 is a "space" at the same time, a delayed synchronization pulse then occurs 200 microseconds after this first timing pulse causing the bit ring counter 21 to be advanced one step or stage. The bit ring counter 21 will remain in this stage until the occurrence of the next external drive pulse at the midpoint of the second bit of the received signal at which time the third stage of the bit ring counter 21 becomes energized. Since the second received data bit is also a "mark" and since it is assumed that the output signal is a "space" at this time, another delayed synchronization signal pulse is passed by the "OR" gate 37 and causes the bit ring counter 21 to be advanced to its fourth stage.

The next input data bit is a "space" so that no synchronization pulse is derived from the received signal and the ring counter 21 is advanced to the fifth stage by the third external drive timing pulse. Since no synchronization pulse occurs during this bit, the fifth stage of the ring counter remains energized until the receipt of the next external drive timing pulse which then causes the ring counter to advance to its sixth stage.

As stated previously, each of the external drive timing pulses applied to the ring counter driver 23 is also applied to the monostable multivibrator 31 to trigger it into its quasi-stable state. At the end of 400 microseconds, which is the duration of the quasi-stable state of this multivibrator in the preferred embodiment, a sample pulse is applied by the multivibrator 31 to the "AND" gates 28 and 30, the appropriate one of which then passes the sample pulse to set the bistable multivibrator 32 to the binary value, "mark" or "space," present at the output of the "AND" gate 27 at that time.

Reference to FIG. 2 shows the pulse waveform of the monostable multivibrator 31 and the sample pulses obtained from the output of this multivibrator at the end of the duration of its quasi-stable state. The duration of the quasi-stable state of the multivibrator 31 is chosen so that these sample pulses coincide with the transitions between the data bits of the incoming received signal as shown in FIG. 2.

The synchronization signal pulses are applied to the ring counter driver 23 and the monostable multivibrator 31 approximately 200 microseconds after the application of an external drive timing pulse to these elements, the time delay being determined by the duration of the quasi-stable state of the monostable multivibrator 40. The duration of the quasi-stable state of the multivibrator 40 is chosen to be less than (preferably half) the duration of the quasi-stable state of the monostable multivibrator 31. Thus, the synchronization pulses passed by the "OR" gate 37 have no effect on the monostable multivibrator 31 since it is still in its quasi-stable state each time that one of these synchronization pulses occurs. However, as has been discussed hereinbefore, the synchronizing pulses do cause the bit ring counter 21 to advance an extra stage between the application of two external drive timing pulses whenever such a delayed synchronization pulse occurs.

The result of this operation is to cause the fixed message signal generator 20 to advance extra steps while the regenerated output signal from the bistable multivibrator 32 entirely skips these extra steps due to the fact that the sample pulses produced by the monostable multivibrator 31 are dependent only upon the external drive pulses and are not affected by the delayed synchronizing signal pulses obtained from the output of the monostable multivibrator 40. As a result, each bit of the regenerated output signal obtained from the bistable multivibrator 32 has a duration equal in length to the duration of each bit of the received signal thereby preventing erroneous operation of the system which otherwise could be caused by the application of data bits of short duration to the priming input of the "AND" gate 39. A standard signal output in which each bit is of equal duration is obtained from the system while at the same time, the generated signal is rapidly brought into message synchronization with the received message.

Once synchronization has been obtained, the synchronization signal input pulses applied to terminal 38 are discontinued manually or automatically so that the control of the signal generator 20 is determined solely by the timing pulses supplied from the external drive to the terminal 36. In this mode of operation the system operates in exactly the same manner as it does when it is under the control of the local oscillator 34 except that bit synchronization of the regenerated output of the signal generator 20 is maintained with the received signal because the timing pulses are derived from the received signal. The regenerated output of the signal generator then may be used in conjunction with the 902A test set or similar equipment in order to determine the error rate of the received message.

The terms "received signal" or "received message" are intended to include signals received over telegraph or telephone lines, signals obtained from the output of a tape reader, or signals obtained from any other suitable external source with which the invention may be used.

It should be noted that while the signal generator 20 has been shown and described using ring counters, shift registers with a diode matrix to give an individual bit sequence or other binary signal generators also may be used.

It will be apparent to those skilled in the art that various modifications and changes may be made to the preferred embodiment of this invention as shown and described without departing from the scope of the invention.

What is claimed is:

1. A message synchronization circuit for a signal generator which generates a message comprised of a predetermined sequence of data bits for comparison with the same message obtained from another source, the synchronization circuit including (a) first driving means for driving the signal generator at the bit rate of the received message;

(b) means responsive to said first driving means for causing the output signal of the signal generator to be sampled and regenerated in synchronism with the bit rate of the received message;

(c) means for comparing the simultaneous data bits in the received message and the regenerated output of the signal generator and having an output signal whenever a predetermined relationship between the compared data bits exists; and (d) second driving means responsive to the output of the comparing means for applying an additional driving signal to the signal generator each time an output signal is obtained from the comparing means to cause the signal generator output to advance an extra bit for each additional driving signal.

2. A message synchronization circuit for a signal generator which generates a message comprised of a predetermined sequence of data bits for comparison with the same message obtained from another source, the synchronization circuit including (a) means for applying timing pulses at the bit rate of the received message to the signal generator to drive the signal generator at the bit rate of the received message;

(b) means responsive to the timing pulses for sampling the output of the signal generator at the bit rate of the received message;

(c) means for applying synchronization pulses to a delay circuit each time data bits of a predetermined type occur in the received message and data bits of a different predetermined type occur in the sampled output of the signal generator; and (d) means for applying the output of the delay circuit to the signal generator to cause it to step an extra bit each time an output pulse from the delay circuit is applied to it, the output pulses from the delay circuit occurring between the sampling times of the means for sampling the output of the signal generator so that the generated message is brought into synchronization with the received message.

3. A circuit according to claim 2 wherein the delay circuit and the means for sampling the output of the signal generator are monostable multivibrators, the duration of the quasi-stable state of the delay circuit multivibrator being less than the duration of the quasi-stable state of the sampling multivibrator.

4. A message synchronization circuit for use with a signal generator which generates a message comprised of a predetermined sequence of data bits of first and second types to be compared with a message comprised of the same predetermined sequence of data bits received from another source, the synchronization circuit including (a) means for applying timing pulses derived from the received message at the bit rate of the received message to the signal generator to drive the signal generator;

(b) means including a first monostable multivibrator responsive to the timing pulses for sampling and regenerating the output signals of the signal generator in synchronization with the bit rate of the received message; and (c) synchronizing means including a second monostable multivibrator in which the duration of the quasi-stable state is less than the duration of the quasi-stable state of the first multivibrator for causing the signal generator to advance an extra bit each time a data bit of the first type occurs in the received message at the same time a data bit of the second type occurs in the regenerated output signal of the signal generator to bring the generated message into synchronization with the received message.

5. A message synchronization circuit for use with a signal generator of the type which generates a message comprised of a predetermined sequence of binary bits to be compared with a message comprised of the same predetermined sequence of binary bits received from another source, the synchronization circuit including (a) means for applying timing pulses derived from the received message at the bit rate of the received message to the signal generator to drive the signal generator;

(b) means responsive to the timing pulses for sampling and regenerating the output signal of the signal generator in synchronism with the bit rate of the received message;

(c) a source of synchronization pulses derived from binary bits of a first type in the received message;

(d) a gate having the synchronization pulses and the regenerated output signal applied thereto and operative to pass a synchronization pulse only when the regenerated signal is a binary bit of a second type at the time a synchronization pulse occurs;

(e) a delay circuit connected to the output of the gate for delaying the synchronization pulses passed by the gate; and (f) means for applying the delayed synchronization pulses to the signal generator to cause the signal generator to advance an extra bit for each delayed synchronization pulse, the extra bits occurring between the sampling intervals of the sampling and regenerating means.

6. A synchronization circuit according to claim 5 where the sampling and regenerating means includes (a) a monostable multivibrator responsive to the timing pulses for generating a sample pulse a predetermined time after the occurrence of each timing pulse; and (b) a bistable regenerating circuit connected to the output of the signal generator and triggered by the sample pulses for causing the regenerated binary output signal to be determined only by the signal present at the output of the signal generator at the instant each sample pulse occurs.

7. A message synchronization circuit for use with a signal generator of the type which generates a message comprised of a predetermined sequence of binary bits having either of two values to be compared with a message comprised of the same predetermined sequence of binary bits received from another source, the synchronization circuit including (a) means for applying timing pulses derived from the received message at the bit rate of the received message to the signal generator to drive the signal generator in bit synchronism with the received message, the timing pulses being spaced $n$ seconds apart where $n$ is a positive number;

(b) a first monostable multivibrator responsive to the timing pulses for generating a sample pulse $n/x$ seconds after the occurrence of each timing pulse, where $x$ is a positive number greater than 1;

(c) a bistable regenerating circuit connected to the output of the signal generator and triggered by the sample pulses to produce a regenerated output signal determined by the signal present at the output of the signal generator at the times of occurrence of the sample pulses;

(d) a source of synchronization pulses derived from binary bits having one value in the received message;

(e) a gate having the synchronization pulses and the regenerated output signal applied thereto and operative to pass a synchronization pulse only when the regenerated signal is a binary bit of the other value at the time a synchronization pulse occurs;

(f) a second monostable multivibrator connected to the output of the gate for delaying the synchronization pulses passed by the gate $n/xy$ seconds, where $y$ is a positive number greater than 1, and (g) means for applying the delayed synchronization pulses to the signal generator to cause the signal generator to advance an extra bit for each delayed synchronization pulse, the extra bits occurring in the intervals between successive sample pulses.

References Cited by the Examiner

UNITED STATES PATENTS

| | | | |
|---|---|---|---|
| 3,056,109 | 9/1962 | Loposer | 340—167 X |
| 3,083,270 | 3/1963 | Mayo | 179—175.31 |
| 3,088,099 | 4/1963 | Du Vall | 340—167 |
| 3,110,866 | 11/1963 | Maure et al. | 328—119 X |
| 3,137,818 | 6/1964 | Clapper | 328—55 |

NEIL C. READ, *Primary Examiner.*

H. I. PITTS, *Assistant Examiner.*